United States Patent
Simantob et al.

[11] Patent Number: 6,024,051
[45] Date of Patent: Feb. 15, 2000

[54] COLLAPSIBLE BIRD HOUSE

[76] Inventors: Constance P. Simantob, 865 Arapahoe Ave., #1, Boulder, Colo. 80302; Cinda H. Johnson, 3756 Wonderland Hill Ave., Boulder, Colo. 80304

[21] Appl. No.: 09/059,986

[22] Filed: Apr. 14, 1998

[51] Int. Cl.[7] .......................... A01K 31/08; A01K 31/04
[52] U.S. Cl. ..................... 119/431; 119/346; 119/461; 119/474; 119/479; 119/469
[58] Field of Search ................... 119/346, 431, 119/461, 474, 463, 479, 469; 135/87, 124, 128, 137, 96, 125, 115; 224/154; 296/163; 190/903; 206/810; D21/834, 838

[56] References Cited

U.S. PATENT DOCUMENTS

| | | | |
|---|---|---|---|
| 2,951,312 | 9/1960 | Engh | 119/431 |
| 3,086,499 | 4/1963 | Dilley | 119/57.9 |
| 3,162,920 | 12/1964 | Durham | 24/265 R |
| 3,602,196 | 8/1971 | Tucci | 119/23 |
| 4,064,662 | 12/1977 | O'Toole | 52/71 |
| 4,077,418 | 3/1978 | Cohen | 135/96 |
| 4,102,352 | 7/1978 | Kirkham | 135/1 R |
| 4,167,917 | 9/1979 | Noll | 119/23 |
| 4,442,793 | 4/1984 | Overpeck et al. | 119/23 |
| 4,766,918 | 8/1988 | Odekirk | 135/96 |
| 4,811,751 | 3/1989 | Maloney, III | 135/106 |
| 5,479,877 | 1/1996 | Demboske | 119/23 |
| 5,493,997 | 2/1996 | Ritchey | 119/23 |
| 5,613,466 | 3/1997 | Mennemeyer | 119/431 |
| 5,699,820 | 12/1997 | Evans et al. | 135/96 |

*Primary Examiner*—Michael J. Carone
*Assistant Examiner*—Son T. Nguyen
*Attorney, Agent, or Firm*—Chrisman Bynum & Johnson

[57] ABSTRACT

A light weight, easily collapsible bird house with a detachable water repellent rainfly/sunshade. The system is made of fabric with removable tension rods, and can be packed flat for transport or storage.

2 Claims, 2 Drawing Sheets

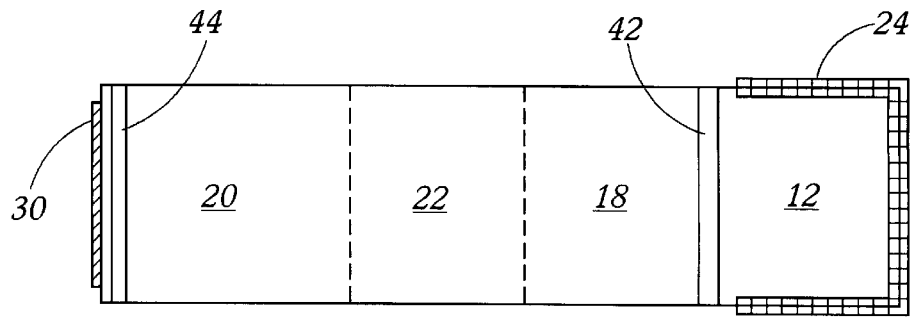
*Figure 2*
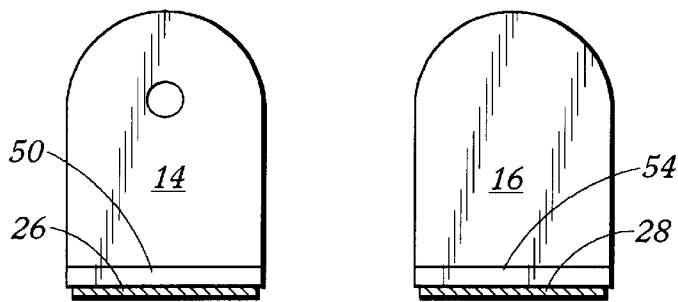
*Figure 3*     *Figure 4*
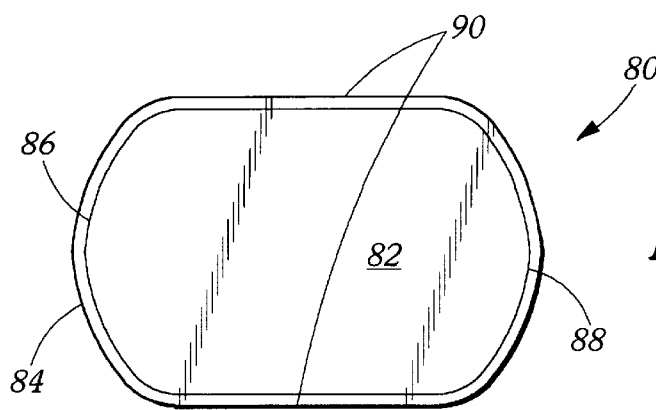
*Figure 5*

COLLAPSIBLE BIRD HOUSE

FIELD OF THE INVENTION

This invention relates to nesting houses for birds, and more particularly to a light weight, easily collapsible bird house system with a detachable water repellent rainfly/sunshade. The system is made of fabric with removable tension rods, and can be easily packed flat for transport or storage with the removal of only two rods.

BACKGROUND OF THE INVENTION

A traditional bird house is made of wood or like rigid material, and is relatively bulky and heavy. These characteristics of the traditional bird house have certain disadvantages.

It is believed that the rigidity, bulk and weight of a traditional bird house of wood or like material creates disadvantageous economies in respect of storage, transport and use. Where the product is rigid and bulky, a merchant, for example, might need to reserve additional shelf or store space for displaying the wares, and additional space to hold stock for sale. Where the traditional product has a fixed-size opening and the merchant must both display and stock a number of models in order to accommodate different varieties of birds, the storage space problem is exacerbated. Even when a wood product can be disassembled to some extent for storage, the bulk of the wood is a limiting factor in how small the package can be made. It would be a desirable improvement to provide a collapsible bird house which can be packed flat for storage and handling.

Where the traditional bird house is not only rigid and bulky, but is also heavy, a manufacturer of such products, for example, might need to account for shipping and transportation costs as an added cost of the goods being sold, and such costs must be absorbed by the consumer, the merchant, the distributor or the manufacturer. Moreover, the bird fancier who purchases the product should also be concerned about transportability, not only from the store to home or other location of use, but from place to place as the user may have a temporary or permanent relocation of the site where the bird house will be used. It would be a desirable improvement to provide a bird house which is not only collapsible by the merchant or user for storage or transport, but which is also relatively light in weight so that the product is easily and economically shipped, transported from store to home (or other location of use) and conveniently portable and movable from place to place.

A traditional bird house made of wood and used in the outdoors is subject to weathering and to deterioration, perhaps requiring special finishes or periodic refinishing. Plastics or other long-lived materials may have the disadvantage of providing a surface which is not ideal for birds, especially fledglings who require some "tooth" in the material to enable their claws to take hold as they seek to exit the bird house. It would be a desirable improvement to construct a bird house of a material which would have long life, and yet which would also have a surface which a bird might be able to grasp with its claws.

Birds deposit waste. The traditional bird house of wood or like material is not always easy to clean. It would be a desirable improvement to provide a bird house which is easily cleaned, inside and out.

Birds might prefer shelter from the sun or rain. The traditional bird house of wood or like material might have a more or less bulky roof, roof overhang, or "awning" of some sort to provide shade or to repel rain, but such added structures contribute to the overall problems of rigidity, bulk and weight already mentioned. It would be a desirable improvement to provide a detachable, collapsible water repellent rainfly/sunshade which can also be packed flat and which is light weight.

The bird house of the present invention is designed to address these and other disadvantages of the traditional bird house made of wood or like material. The bird house system of this invention affords a collapsible, light weight, portable solution. The material is a sturdy fabric which is supported by removable rods and, when the rods are removed, it can be collapsed and packed flat. The entire system is light weight for easy transport. The bird house system of this invention provides a suitable and long-lasting material of durable fabric which has a cloth surface on the inside which is suitable for fledglings.

Fiberglass rods impart rigidity to the bird house and two of the internal rods and the eave rod can be easily removed to pack the bird house flat and tight (that is, in a package not only flat but relatively small, approximately twelve inches by fifteen inches). The bird house system of this invention is water and stain resistant, and has a zipper bottom for cleaning. The bird house system of this invention includes a detachable water repellent rainfly/sunshade which is made of sturdy fabric, supported by perimeter rods, is lightweight and capable of being removed from the bird house and packed flat.

These and other advantages of the collapsible bird house system of this invention will be explained in the discussion which follows.

SUMMARY OF THE INVENTION

The bird house system of this invention includes a house subassembly and, in a preferred embodiment, also includes an optional rainfly/sunshade subassembly. In this discussion, the house subassembly will be discussed first, followed by a discussion of the rainfly/sunshade subassembly. Finally, certain associated devices and features will be discussed.

The house subassembly includes a bottom, a front piece, back piece, left side piece, right side piece and top piece, each preferably made from a sturdy fabric material—a colorfast 600 denier water and stain resistant poly fiber with urethane coating is suitable. The front, back, top and side pieces are sewn or otherwise attached to create the shape of a mailbox, and structural form is imparted by rods. In one embodiment, the rods are one-sixteenth inch fiberglass, but other rods may be used, depending on the desired size of the construction. At the edges and periphery of the fabric structure are openings adapted to receive the rods. In the embodiment described herein, the openings are five-thirty-seconds inch hollow plastic interior channels.

The bottom piece is, in the embodiment described herein, sewn or otherwise attached to the fabric structure at one of the bottom edges defined by the front piece, back piece and side piece (the bottom piece could also be integrally formed as a part of one of those pieces). The connection of the bottom piece to the other three sides of the fabric structure is accomplished by a removable connector, preferably, a coil zipper. The connection might, of course, be constructed or effected in any number of ways and by any number of devices, including a VELCRO type of hook and loop connector, tabs, buttons, snaps, grommets, ties, loops, hooks, laces, dowels, bolts, press-fittings, adhesive materials or the like. The connection so described permits the bottom to be opened (in the preferred embodiment, by unzipping it) for cleaning.

Brass eyelets in the bottom provide drainage and ventilation. An opening is provided in the front piece for entry into and exit from the fabric structure. In the preferred embodiment described herein, the opening is circular, and is reinforced by a solid five-thirty-second inch welt around the opening, which gives the dimension for the parent bird to light on while preventing predator birds the easy access present when an actual perch is incorporated in the design.

The rainfly/sunshade subassembly includes a shield piece of sturdy fabric material—a colorfast 600 denier water and stain resistant poly or nylon fiber is suitable. Preferably, the shield piece is sized large enough not only to cover the house subassembly, but also to extend over the front sufficiently far to create an overhang over the front of the house. For ease of manufacture, assembly and connection to the house, a single piece of generally rectangular or oval shape is preferred.

By providing a taper at the ends (as in the oval shape described herein, or by a triangular cutting of the ends of a rectangular shape), an extending flap can be supported over the side walls of the house by rods. By using an oval shape, the shield piece can be given structural shape and firmness by inserting flexible rods, appropriately sized in relation to the periphery of the shield piece to create a tension. In the preferred embodiment, the rods are one-sixteenth inch fiberglass, but other rods may be used. At the periphery of the fabric of the shield piece is an opening adapted to receive the rods. In the embodiment described herein, the openings are five-thirty-seconds inch hollow plastic interior channels.

The rainfly/sunshade subassembly may be removably attached to the house subassembly by removable connection between the top of the house and the bottom surface of the shield piece. In a preferred embodiment, a VELCRO type hook and loop connector is used. The connection might, of course, be constructed or effected in any number of ways and by any number of devices, including tabs, buttons, snaps, grommets, ties, loops, hooks, laces, dowels, bolts, press-fittings, adhesive materials or the like. It is preferred that the connection be a removable one, because the entire structure is made of collapsible fabric material.

Further support to the rainfly/sunshade subassembly when attached to the house subassembly is provided by buttress rods. A shield piece grommet at each of the lateral ends of the shield piece accepts a buttress rod which runs through the shield piece grommet to a bottom grommet at or near the bottom sides of the house subassembly. The buttress rods are secured in place by rubber end caps at each end with an O-ring on the opposite side of the grommet. The buttress rods are preferably flexible in order to provide a tension fit and one-sixteenth inch fiberglass rod inserted into a five-thirty-second inch hollow plastic welt (grommet tab) has been found to be suitable for use.

Other associated devices and features will now be discussed.

The house subassembly may be lined with a loop cloth to provide a suitable surface for birds (so that, for example, a fledgling inside the house might be able to grasp the inside surface with its claws and so reach the opening).

A one-quarter inch diameter fiberglass eave and hanging rod, hole-drilled in each end is provided for mounting the bird house system to a tree limb or other external support. The mounting rod is inserted at the top of the house subassembly (running lengthwise from front to back) and beneath the rainfly/sunshade subassembly. A 22 gauge brass wire runs from the hole drilled in one end of the mounting rod to the hole drilled in the other end, and a brass swivel/hook attached to the wire will suspend the wire, and the attached bird house system, to a tree limb or other external support.

DESCRIPTION OF THE DRAWINGS

FIG. 2 is a top view of an integrally formed, unitary bottom piece, left side piece, top piece and right side piece for use in the system of this invention.

FIG. 3 is a front view of a front piece for use in the system of this invention.

FIG. 4 is a front view of a back piece for use in the system of this invention.

FIG. 5 is a top view of a shield piece for use in the system of this invention.

DETAILED DESCRIPTION OF THE INVENTION

Figure 1:
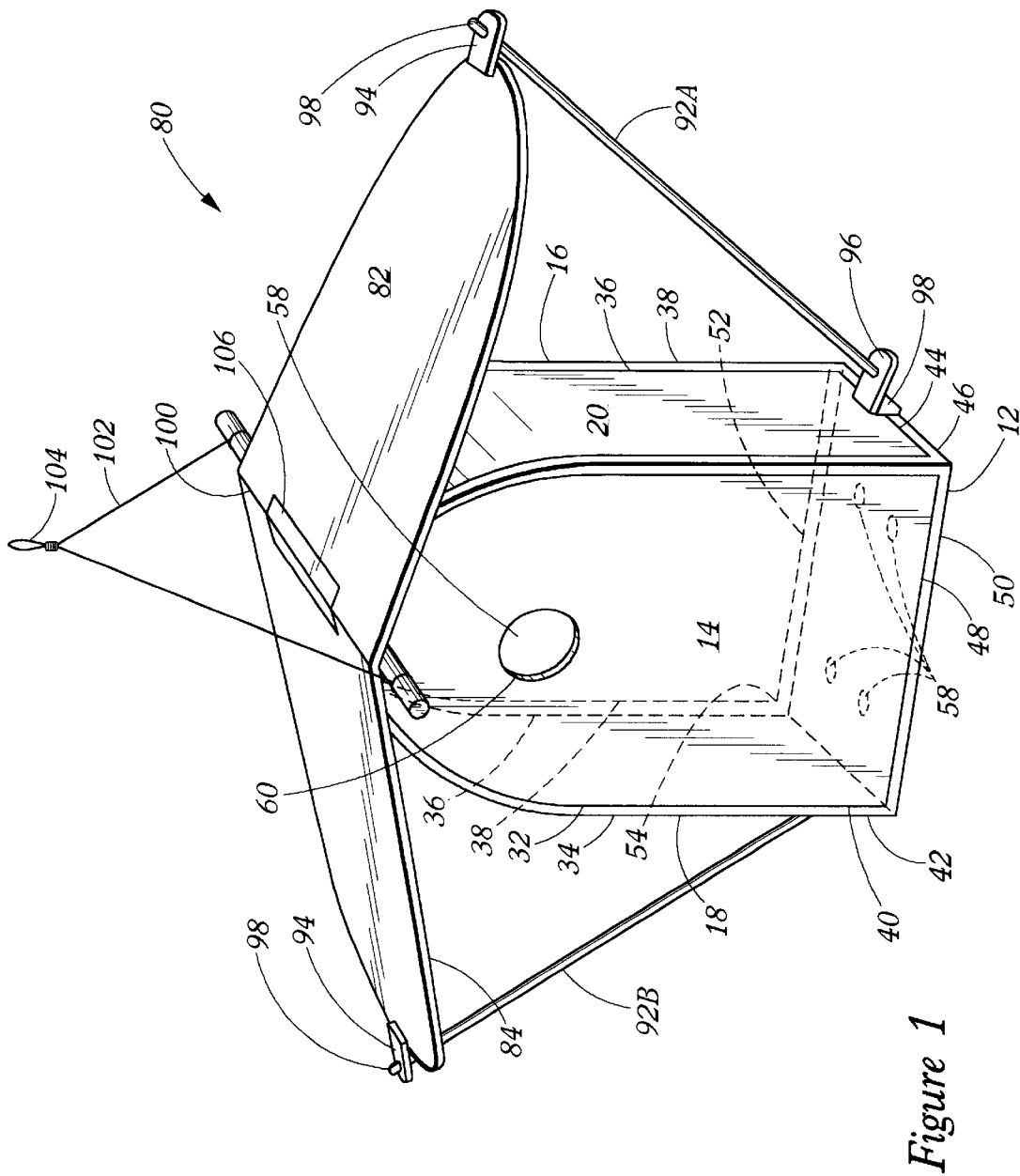
FIG. 1 is a perspective view of the bird house system of this invention.

With reference to FIG. 1, it may be seen that the bird house system of this invention includes a house subassembly 10 and, a rainfly/sunshade subassembly 80. The house subassembly 10 includes a bottom 12, a front piece 14, back piece 16, left side piece 18, right side piece 20 and top piece 22. Each is made from a sturdy fabric material—a colorfast 600 denier water and stain resistant poly fiber is suitable.

The front piece, back piece and side piece are sewn or otherwise attached to create the shape of the bird house, and structural form is imparted by removable rods. In a preferred embodiment, a single piece of fabric may be folded over to create the bottom 12, the left side 18, the top 22, and the right side 20 (see FIG. 2). Thus, a rectangular-shaped foldable floor-side-roof piece 11 is described by a first portion (12) which constitutes the floor, a second portion (18) constituting a left side wall, a third portion (22) constituting the roof, and a fourth portion (20) constituting a right side 20 wall.

The front piece 14 is sewn to the front edges of left side 18, top 22, and right side 20, and the back piece is sewn to the back edges of left side 18, top 22, and right side 20 to create the structure of FIG. 1. A coil zipper 24 (reference FIG. 2) on three sides of bottom 12 mates with bottom zippers 26 and 28 on the front and back pieces 14 and 16 (reference FIGS. 3 and 4) and with bottom zipper 30 on right side 20 to connect the bottom in such a way as to permit the bottom to swing open for cleaning by unzipping (the bottom swings open upon the edge which is joined to left side piece 18).

The house subassembly 10 receives structural form from rods. In one embodiment, the rods are one-sixteenth inch fiberglass, but other rods may be used. At the edges and periphery of the fabric structure are openings adapted to receive the rods. In the embodiment described herein, the openings are five-thirty-seconds inch hollow plastic interior channels with reference to FIG. 1, it may be understood that a first fiberglass rod 32 (not visible) inserted into front perimeter welt 34; a second fiberglass rod 36 (not visible) inserted into back perimeter welt 38; a third fiberglass rod 40 (not visible) inserted into left side interior channel 42; and a fourth fiberglass rod 44 (not visible) inserted into right side interior channel 46 impart rigidity.

While it would be possible to use a fifth fiberglass rod 48 (not visible) inserted into front interior channel 50; and a sixth fiberglass rod 52 (not visible) inserted into back interior channel 54 to impart rigidity to the structure, the preferred embodiment does not include rods 48 and 52, but relies upon the circumferential pressure of rods 32 and 34 to maintain the dimensionality (shape) of the structure.

It can now be understood that the simple insertion of two rods (32 and 34) suffices, in the preferred embodiment, to create the structural form of the house. Likewise, it only requires the removal of these two rods to collapse the structure and leave it flat. The two rods 32 and 34 are preferably carried in front and back perimeter welts or channels of the floor-side-roof piece 11. Of course, they could just as easily be carried in welts or channels in the front piece 14 and back piece 16, or in the place where the font and back pieces are joined to the floor-side-roof piece.

As previously explained, the bottom piece 12 could, in the embodiment described herein, be sewn or otherwise attached to the fabric structure at one of the bottom edges defined by the front piece 14, back piece 16 and side pieces 18 and 20. Here, and as previously explained in connection with FIG. 2, the bottom piece 12 is integrally formed as a part of the left side 18, top 22 and right side 20. The connection of the bottom piece 12 to the other three sides of the fabric structure is accomplished by a removable connector, preferably, a coil zipper 24. The connection might, of course, be constructed or effected in any number of ways and by any number of devices, including a VELCRO type of hook and loop connector, tabs, buttons, snaps, grommets, ties, loops, hooks, laces, dowels, bolts, press-fittings, adhesive materials or the like. The connection so described permits the bottom to be opened (in the preferred embodiment, by unzipping it) for cleaning.

Brass eyelets 56 in the bottom 12 provide drainage and ventilation. An opening 58 is provided in the front piece 14 for entry into and exit from the fabric structure. In the preferred embodiment described herein, the opening 58 is circular, and is reinforced by a solid five-thirty-second inch interior channel 60 around the opening.

Suitable dimensions for a house assembly are as follows:

Width (from left to right sides) : 6 inches;

Height: 10 inches;

Length (depth, from front to back): 7 inches.

Suitable rod dimensions are as follows (each is 1/16 inch diameter):

First and Second Rods: (front and back perimeter rods 32 and 36): 19¾ inches;

Third and Fourth Rods: (left and right side rods 40 and 44): 8 inches;

Fifth and Sixth Rods: (front and back rods 48 and 52): 7 inches.

Suitable dimensions for the integral bottom 12, left side 18, top 22 and right side 20 pieces are 29½ inches by 8 inches.

The rainfly/sunshade subassembly 80 includes a shield piece 82 of sturdy fabric material—a colorfast 600 denier water and stain resistant poly or nylon fiber is suitable. Preferably, the shield piece is sized large enough not only to cover the house subassembly 10, but also to extend over the front 14 sufficiently far to shield the opening 58 of the house. For ease of manufacture, assembly and connection to the house, a single piece of generally rectangular or oval shape is preferred.

By providing a taper at the ends (as in the oval shape described herein, or by a triangular cutting of the ends of a rectangular shape), an extending flap can be supported over the side walls 18 and 20 of the house by rods. By using an oval shape, the shield piece can be given structural shape and firmness by inserting flexible rods, appropriately sized in relation to the periphery of the shield piece to create a tension. In the preferred embodiment, the rods are one-sixteenth inch fiberglass, but other rods may be used. At the periphery of the fabric of the shield piece 82 is an opening 84 adapted to receive the rods. In the embodiment described herein, the opening 84 is a five-thirty-seconds inch hollow plastic interior channel. The rods 86, 88 meet at the center (90 with reference to FIG. 5) of the top piece 82.

The rainfly/sunshade subassembly 80 may be removably attached to the house subassembly 10 by removable connection between the top 22 of the house and the bottom surface of the shield piece 82. In a preferred embodiment, a VELCRO type hook and loop connector 106 is used. The connection might, of course, be constructed or effected in any number of ways and by any number of devices, including tabs, buttons, snaps, grommets, ties, loops, hooks, laces, dowels, bolts, press-fittings, adhesive materials or the like. It is preferred that the connection be a removable one, because the entire structure is made of collapsible fabric material, and to retain the advantages of collapsibility.

Further support to the rainfly/sunshade subassembly 80 when attached to the house subassembly 10 is provided by buttress rods 92A and 92B. A shield piece grommet 94 at each of the lateral ends of the shield piece 82 accepts a buttress rod 92A or 92B which runs through the shield piece grommet 94 to a bottom grommet 96 at or near the bottom of sides 18 and 20 of the house subassembly. The buttress rods 92A or 92B are secured in place by rubber end caps 98 at each end of rods 92A and 92B and O-rings are placed on the opposite side of the grommet tabs. The buttress rods are preferably flexible in order to provide a tension fit and a one-sixteenth inch fiberglass rod inserted into a five-thirty-second inch welt (grommet tab) has been found to be suitable for use. A suitable dimension is ten inches in length.

Other associated devices and features will now be discussed.

The house subassembly 10 may be lined with a loop cloth to provide a suitable surface for birds (so that, for example, a fledgling inside the house might be able to grasp the inside surface with its claws and so reach the opening 58).

A one-quarter inch diameter fiberglass mounting/eave rod 100, hole-drilled in each end is provided for mounting the bird house system to a tree limb or other external support. A mounting rod of fourteen inches in length has been found to be suitable. The mounting/eave rod 100 is inserted at the top of the house subassembly 10 (running lengthwise from front to back) through the VELCRO type hook and loop connector-closed channel and beneath the rainfly/sunshade subassembly 80. A 22 gauge brass wire 102 runs from the hole drilled in one end of the mounting/eave rod 100 to the hole drilled in the other end, and a brass swivel/hook 104 attached to the wire will suspend the wire, and the attached bird house system, to a tree limb or other external support.

What is claimed is:

1. A collapsible bird house, comprising:
    (a) a rectangular-shaped foldable floor-side-roof piece, said piece including:
        a first portion constituting a floor having first, second and third edges, the edges carrying first, second and third releasable connector means for making a releasable connection to a corresponding mating connector;
        a second portion adjoining the first portion, said second portion constituting a left side wall;
        a third portion adjoining the second portion, said third portion constituting a roof; and a fourth portion adjoining the third portion, said fourth portion constituting a right side wall;

the right side wall having a first mating connector means for making a releasable connection with the first releasable connector means of the floor;

(b) a front wall piece connected to the floor-side-roof piece at the left side wall, roof and right side wall; and having on a bottom thereof a second mating connector means for making a releasable connection with the second releasable connector means of the floor;

(c) a back wall piece connected to the floor-side-roof piece at the left side wall, roof and right side wall; and having on a bottom thereof a third mating connector means for making a releasable connection with the third releasable connector means of the floor;

(d) wherein the first, second, and third releasable connector means and the corresponding first, second, and third mating connector means have a first position in which the floor is closed; and a second position in which the floor is open; the second position being one in which the floor opens by pivoting downwards, (e) wherein the floor-side-roof piece, the front wall piece and the back wall piece are made of a fabric material, and further comprising:

(f) an eave rod, and a pair of removable flexible tension rods which, when the eave rod is inserted into a channel on the roof, and the pair of rods are inserted into a pair of channels carried in one of: (i) the floor-side-roof piece and (ii) the front and back wall pieces, impart a rigid, mail box shape to the bird house; and which, when removed from said channels, leave the pieces flat, and (g) a removable fabric rainfly/sunshade removably attached to a centerline of the roof, and extending over the front, back and sides of the bird house, supported by a first side rod and a second side rod, said rainfly/sunshade having means for carrying at least one removable, flexible tension rod disposed along the perimeter of the rainfly/sunshade.

2. The bird house of claim 1, wherein the first, second, and third releasable connector means and the corresponding first, second, and third mating connector means are mating zippers, and the first and second positions are attained by zipping and unzipping said zippers.

* * * * *